US011741220B2

(12) United States Patent
Yu et al.

(10) Patent No.: US 11,741,220 B2
(45) Date of Patent: Aug. 29, 2023

(54) MINING AND INTEGRATING PROGRAM-LEVEL CONTEXT INFORMATION INTO LOW-LEVEL SYSTEM PROVENANCE GRAPHS

(71) Applicant: NEC Laboratories America, Inc., Princeton, NJ (US)

(72) Inventors: Xiao Yu, Princeton, NJ (US); Haifeng Chen, West Windsor, NJ (US); Fei Zuo, Columbia, SC (US)

(73) Assignee: NEC Corporation

( * ) Notice: Subject to any disclaimer, the term of this patent is extended or adjusted under 35 U.S.C. 154(b) by 186 days.

(21) Appl. No.: 17/398,514

(22) Filed: Aug. 10, 2021

(65) Prior Publication Data

US 2022/0050895 A1 Feb. 17, 2022

Related U.S. Application Data

(60) Provisional application No. 63/065,530, filed on Aug. 14, 2020.

(51) Int. Cl.
*G06F 21/52* (2013.01)
*G06F 16/2458* (2019.01)
(Continued)

(52) U.S. Cl.
CPC .............. *G06F 21/52* (2013.01); *G06F 9/547* (2013.01); *G06F 16/2465* (2019.01);
(Continued)

(58) Field of Classification Search
CPC ...... G06F 21/52; G06F 9/547; G06F 16/2465; G06F 21/55; G06F 2221/033;
(Continued)

(56) References Cited

U.S. PATENT DOCUMENTS 10,313,365 B2 * 6/2019 Jang .................... H04L 63/1425
10,664,501 B2 * 5/2020 Kandogan ............. G06F 16/288
(Continued)

OTHER PUBLICATIONS

Lee, Kyu Hyung, et al. "High Accuracy Attack Provenance via Binary-based Execution Partition", InNDSS, Feb. 2013, pp. 1-16.
(Continued)

*Primary Examiner* — J. Brant Murphy
(74) *Attorney, Agent, or Firm* — Joseph Kolodka

(57) ABSTRACT

A computer-implemented method is provided for computer intrusion detection. The method includes establishing a mapping from low-level system calls to user functions in computer programs. The user functions run in a user space of an operating system. The method further includes identifying, using a search algorithm inputting the mapping and a system-call trace captured at runtime, any of the user functions that trigger the low-level system calls in the system-call trace. The method further includes performing, by a processor device, intrusion detection responsive to a provenance graph with program contexts. The provenance graph has nodes formed from the user functions that trigger the low-level system calls in the system-call trace. Edges in the provenance graph have edge labels describing high-level system operations for low-level system call to high-level system operation correlation-based intrusion detection.

20 Claims, 10 Drawing Sheets

(51) Int. Cl.
*G06N 5/022* (2023.01)
*G06F 21/55* (2013.01)
*G06F 9/54* (2006.01)

(52) U.S. Cl.
CPC .............. *G06F 21/55* (2013.01); *G06N 5/022* (2013.01); *G06F 2221/033* (2013.01)

(58) Field of Classification Search
CPC ...... G06F 21/51; G06F 21/566; G06F 21/554; G06N 5/022; G06N 20/00
See application file for complete search history.

(56) References Cited

U.S. PATENT DOCUMENTS

| 2007/0294432 | A1* | 12/2007 | Takase | H04L 9/0833 709/248 |
|---|---|---|---|---|
| 2018/0048662 | A1* | 2/2018 | Jang | H04L 63/1416 |
| 2018/0101596 | A1* | 4/2018 | Kandogan | G06F 16/288 |
| 2021/0165588 | A1* | 6/2021 | Brinkmann | G06F 3/0631 |
| 2021/0176260 | A1* | 6/2021 | Pan | H04L 63/0884 |

OTHER PUBLICATIONS

Hassan, Wajih Ui, et al. "OmegaLog: High-Fidelity Attack Investigation via Transparent Multi-Layer Log Analysis", InNetwork and Distributed System Security Symposium. Jan. 2020, pp. 1-16.

Shu, Xiaokui, et al. "Unearthing Stealthy Program Attacks Buried in Extremely Long Execution Paths", InProceedings of the 22nd ACM SIGSAC Conference on Computer and Communications Security. Oct. 12, 2015, pp. 1-13.

Ma, Shiqing, et al. "Protracer: Towards Practical Provenance Tracing by Alternating Between Logging and Tainting", InNDSS. Feb. 21, 2016, pp. 1-15.

Nisi, Dario, et al. "Exploring Syscall-Based Semantics Reconstruction of Android Applications", In22nd International Symposium on Research in Attacks, Intrusions and Defenses ({RAID} 2019). Sep. 2019, pp. 517-531.

Kwon, Yonghwi, et al. "MCI: Modeling-based Causality Inference in Audit Logging for Attack Investigation", InNDSS. Feb. 2018, pp. 1-15.

* cited by examiner

MINING AND INTEGRATING PROGRAM-LEVEL CONTEXT INFORMATION INTO LOW-LEVEL SYSTEM PROVENANCE GRAPHS

RELATED APPLICATION INFORMATION

This application claims priority to U.S. Provisional Patent Application No. 63/065,530, filed on Aug. 14, 2020, incorporated herein by reference in its entirety.

BACKGROUND

Technical Field

The present invention relates to graph processing and more particularly mining and integrating program-level context information into low-level provenance graphs.

Description of the Related Art

Capturing and understanding program and system behaviors is a common task that has many applications in the areas of system security, maintenance, monitoring, and management. A state-of-the-art practice to accomplish that task is through capturing and digesting low-level system calls. Such system calls are the means that a user program may invoke for operating system services, such as reading a file on disk, and they directly reflect interactions with the operating system or external behaviors a program exhibits at runtime. Modern operating systems usually come with built-in mechanisms for system-call capturing, e.g., audit in Linux, and Event Tracing for Windows (ETW) in Windows®, thereby making this practice easy to implement in a general and program-agnostic way. The captured system-call data enable a series of applications.

Over the years, there have been advances in enriching system-call data to support more sophisticated applications. Notably, a "horizontal" enrichment is to construct provenance graphs from low-level system-call data to provide a holistic view of program and system behaviors and their interactions. In provenance graphs, a node can be a process (a runtime instance of a program), a file, a network endpoint, or otherwise defined in different embodiments of such graphs; and edges are system-call and timestamp labels related to the nodes, e.g., "a process writes a file" would result in a process node and a file node connected by a write edge with the timestamp of that write operation; and similarly "a process starts another process" as two process nodes with a start edge. With different nodes and edges, such graphs are intended to bind seemingly disassociated system-call data across time and processes together in a "horizontal" way. Applications built on provenance graphs work more effective in some scenarios than those using raw system-call data. For instance, intrusion detection using graphs may enjoy more context information (i.e., neighboring nodes and edges in a graph) to distinguish between unusual system calls that are merely outliers and real threats.

While the graph-based "horizontal" enrichment is proven to be effective in some scenarios, it suffers from challenges in both graph construction and further enrichment of high-level context information. In graph construction, making system-call data into graphs without proper pruning can result in the problem of so-called "dependency explosion," which means both relevant and irrelevant nodes and edges are put together and being connected, leading to a large graph size as well as noises that interfere with applications built upon. The pruning of nodes and edges is often difficult as well because there lacks high-level (program-level) context information as definitive guidance. The pruning is usually done with approximated dependencies based on time proximity using timestamps, or certain repetitive graph patterns. Should high-level context information be incorporated, the pruning would be more effective with substantial evidence of true dependencies in the program. That naturally leads to the second challenge on further enriching provenance graphs with high-level context information. The current graph construction is solely based on low-level system-call data, which essentially limits the constructed graphs to revealing only low-level behaviors. It is not straightforward to incorporate high-level information into this process, because there is no preexisting mapping from low-level system calls to high-level program logic. Creating this mapping would either require heavy program instrumentation that is strongly disfavored by real-world system deployments or introduce uncertainties and imprecisions if otherwise done by other existing methods.

SUMMARY

According to aspects of the present invention, a computer-implemented method is provided for computer intrusion detection. The method includes establishing a mapping from low-level system calls to user functions in computer programs. The user functions run in a user space of an operating system. The method further includes identifying, using a search algorithm inputting the mapping and a system-call trace captured at runtime, any of the user functions that trigger the low-level system calls in the system-call trace. The method further includes performing, by a processor device, intrusion detection responsive to a provenance graph with program contexts. The provenance graph has nodes formed from the user functions that trigger the low-level system calls in the system-call trace. Edges in the provenance graph have edge labels describing high-level system operations for low-level system call to high-level system operation correlation-based intrusion detection.

According to other aspects of the present invention, a computer program product is provided for computer intrusion detection. The computer program product includes a non-transitory computer readable storage medium having program instructions embodied therewith. The program instructions are executable by a computer to cause the computer to perform a method. The method includes establishing, by a processor device of the computer, a mapping from low-level system calls to user functions in computer programs. The user functions run in a user space of an operating system. The method further includes identifying, by the processor device using a search algorithm inputting the mapping and a system-call trace captured at runtime, any of the user functions that trigger the low-level system calls in the system-call trace. The method also includes performing, by the processor device, intrusion detection responsive to a provenance graph with program contexts. The provenance graph has nodes formed from the user functions that trigger the low-level system calls in the system-call trace. Edges in the provenance graph have edge labels describing high-level system operations for low-level system call to high-level system operation correlation-based intrusion detection.

According to yet other aspects of the present invention, a computer processing system is provided for computer intrusion detection. The computer processing system includes a memory device for storing program code. The computer processing system further includes a hardware processor operatively coupled to the memory device for running the program code to establish a mapping from low-level system calls to user functions in computer programs. The user functions run in a user space of an operating system. The hardware processor further runs the program code to identify, using a search algorithm inputting the mapping and a system-call trace captured at runtime, any of the user functions that trigger the low-level system calls in the system-call trace. The hardware processor also runs the program code to perform intrusion detection responsive to a provenance graph with program contexts. The provenance graph has nodes formed from the user functions that trigger the low-level system calls in the system-call trace. Edges in the provenance graph have edge labels describing high-level system operations for low-level system call to high-level system operation correlation-based intrusion detection.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
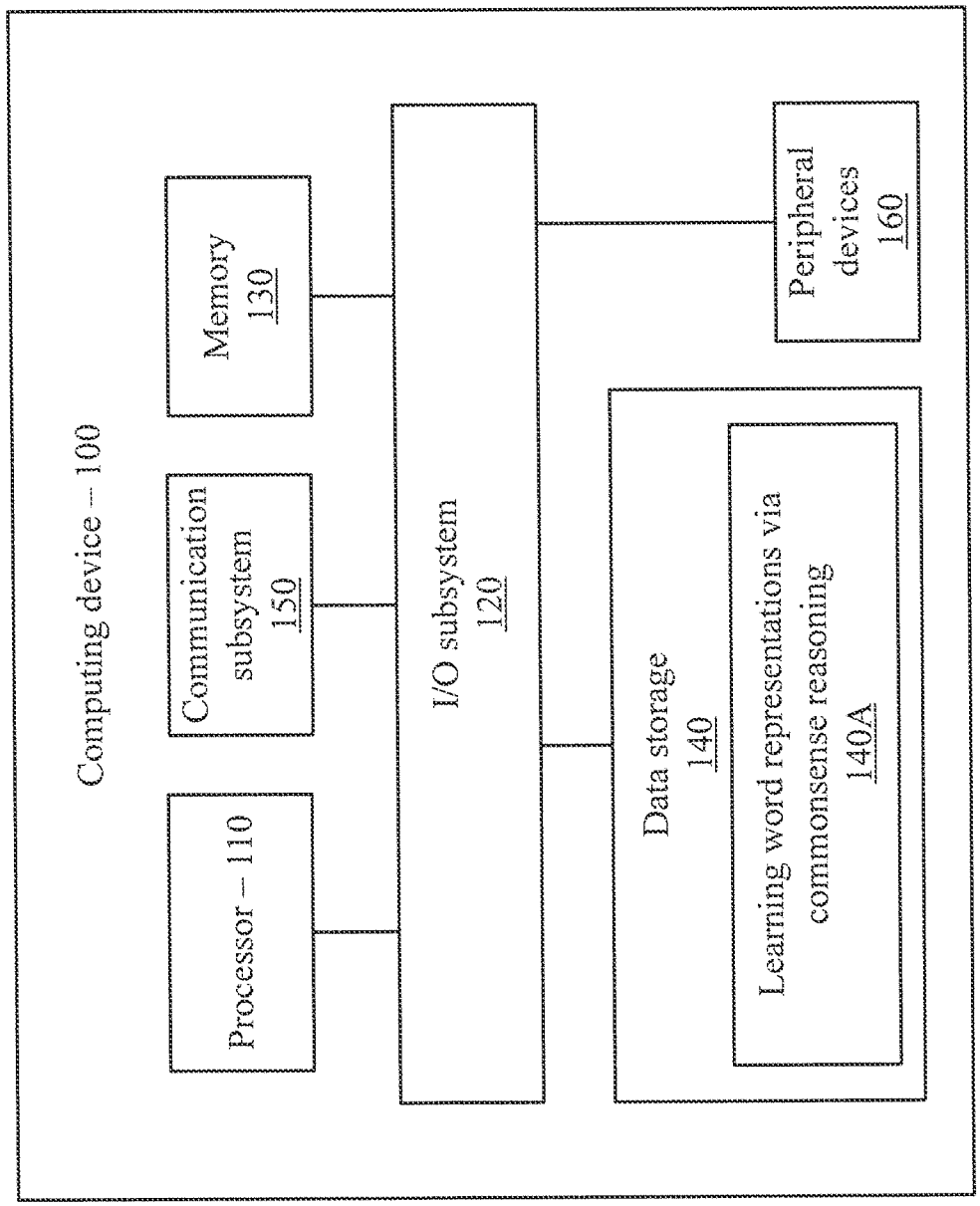
FIG. 1 is a block diagram showing an exemplary computing device, in accordance with an embodiment of the present invention.

Embodiments of the present invention are directed to mining and integrating program-level context information into low-level provenance graphs.

Embodiments of the present invention are configured to integrate program-level information with low-level system-call data to achieve a "vertical" enrichment for provenance graphs. Instead of doing heavy program instrumentation or complex program analysis to get exact mapping between different levels of information, embodiments of the present invention use lightweight binary analysis and data-driven techniques to reduce the problem to a search problem.

In an embodiment, the present invention can include the following two top-level components: (1) a method to establish a mapping from low-level system calls to user functions (referring to functions that run in the user space rather than in the kernel space of the operating system) in individual programs; and (2) a search algorithm taking the established mapping and a system-call trace captured at runtime to identify user functions that trigger the captured low-level system calls in the trace.

To establish the mapping, the invention performs binary analysis and machine learning on user programs of interest in three steps to (1) extract control flow graphs (CFGs) from individual user functions and identify CFG nodes that either trigger system calls or make function calls to other user functions; (2) perform graph walks through the identified system-call-triggering nodes on each user-function CFG and all relevant CFGs related by function calls to generate and collect system-call sequences that the function may trigger; (3) using the collected sequences, train an system-call-sequence embedding model that can convert a system-call sequence to a vector-space representation.

An embodiment of a search algorithm in accordance with the present invention include the following three major components: (1) a heuristic method to segment an input system-call trace in order to reduce the search space for user function identification; (2) a search method leveraging the embedding model, system-call sequences collected from CFGs, and a set of heuristics to enumerate candidates of possible user functions within a segment of the input system-call trace; (3) a quality measurement function to compare different candidates and select the most likely candidate(s) as the search output.

In the solution space, embodiments of the present invention rely on much less assumptions on system deployment and supporting components to achieve the goal compared to any possible state-of-the-art techniques that may be applied to solve the same problem. In particular, the invention does not rely on heavy runtime instrumentation or complex program analysis, which represent two common techniques that may be applied to collect and integrate cross-level information in an exact way. These common techniques would introduce changes unfavored by customers to the target system, impose runtime overhead adversely affecting down system performance, and succumb to scalability challenges from complex programs and systems under investigation.

Instead, embodiments of the present invention reduce the problem to a search problem, and solve it by combining a system-call-sequence embedding model and a search algorithm, with a system-call tracer as a single component deployed to the target system. The creation of the embedding model only uses minimal binary analysis to extract function-level CFGs, and then abstracts complex program logic into system-call sequences that are later used by the search algorithm to perform a similarity search. As a result, the embedding model effectively replaces complex program analysis that would attempt to get exact feasible system-call sequences by solving path satisfiability, but not scale well to large programs.

By using a search algorithm to "search" likely user functions corresponding to low-level system calls, embodiments of the present invention also effectively remove the need for runtime instrumentation, which would instrument every program at runtime and capture a full call stack (including user function names) every time a system call is triggered, causing significant performance overhead.

FIG. 1 is a block diagram showing an exemplary computing device 100, in accordance with an embodiment of the present invention. The computing device 100 is configured to mine and integrate program-level context information into low-level system provenance graphs.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for mining and integrating program-level context information into low-level system provenance graphs. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
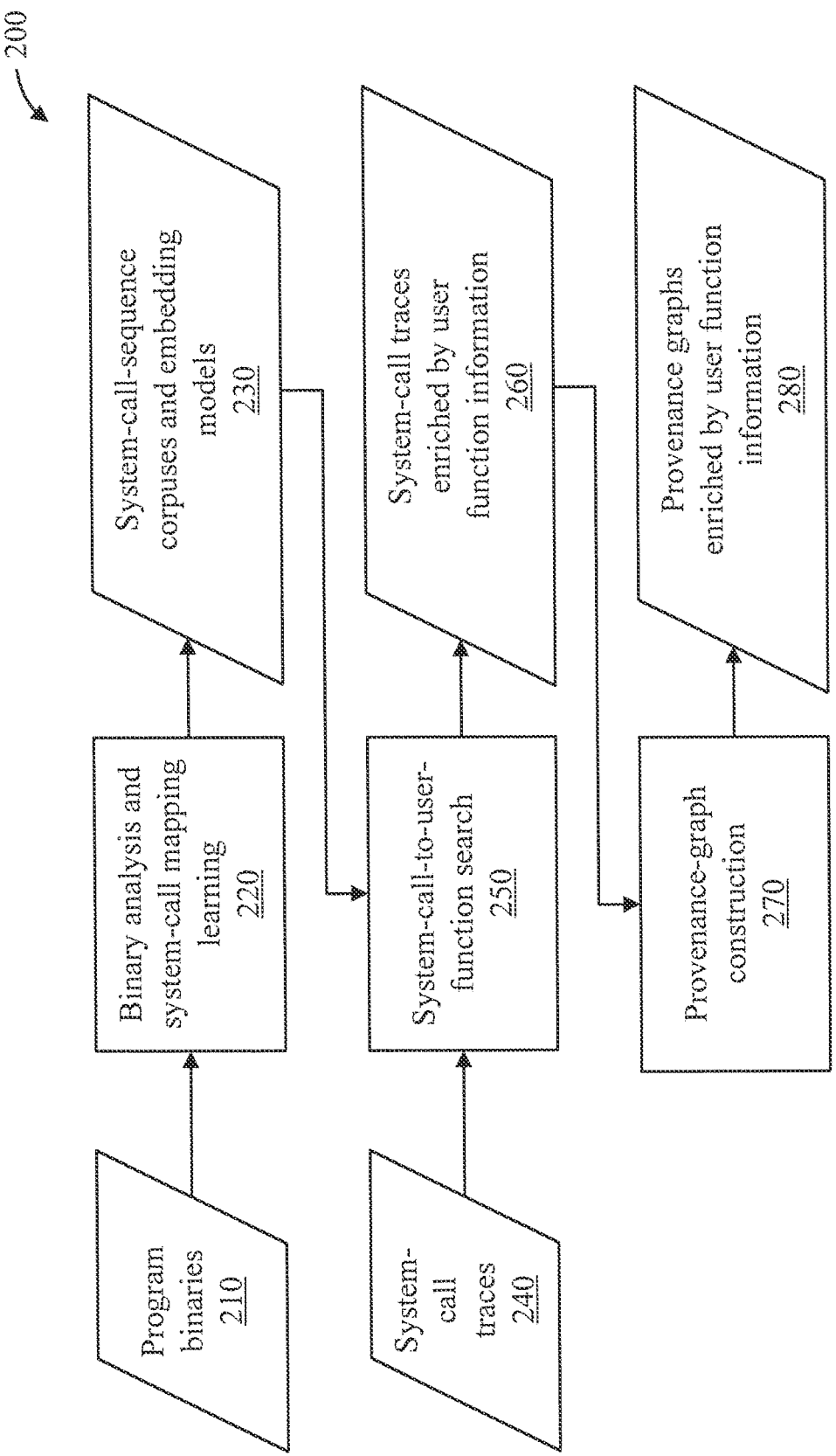
FIG. 2 is a flow diagram showing an exemplary system workflow, in accordance with an embodiment of the present invention.

These and other variations of a hardware processor subsystem are also contemplated in accordance with embodiments of the present invention FIG. 2 is a flow diagram showing an exemplary system workflow 200, in accordance with an embodiment of the present invention.

The system workflow 200 involves the following blocks: program binaries 210; binary analysis and system-call mapping learning 220; system-call-sequence corpuses and embedding models 230; system-call traces 240; system-call-to-user-function search 250; system-call traces enriched by user function information 260; provenance graph construction 270; and provenance graphs enriched by user function information.

A program binary 210 is a physical file including metadata and instructions required for a computer system to execute the program. Program binaries are the required input of the system of the present invention because the system relies on information extracted from one or more program binaries to enrich system-call traces. Only those runtime system-call traces from processes whose program binaries are analyzed by the system can be enriched.

The binary analysis and system-call mapping learning 220 block performs analysis on the input program binaries and extract system-call and user-function information. In particular, it generates a system-call-sequence corpus for each user function identified in the program binaries. Such corpus represents the possible system-call sequence patterns for each user function. Using corpuses from all analyzed user functions, block 220 trains an embedding model that can convert a system-call sequence to a vector-space representation. In addition, block 220 also collects calling relations between user functions for downstream steps.

System-call-sequence corpuses and embedding models 230 are the major outputs from binary analysis and system-call mapping learning 220. For each user function identified in a program binary, 220 generates a corpus including some possible system-call sequences that may be the result of executing the function. System-call sequences in the corpus may be of different lengths but may not exceed a predefined maximum length. An example of a system-call sequence could be "getsockname sendto recvmsg recvmsg," which is similar to a natural language sentence, while each word in the sentence is the name of a system call predefined by the underlying operating system. An embedding model can convert such a system-call sequence to a fixed-length vector that represents the sequence in a mathematical space for computations of distance between different sequences.

System-call traces 240 are the input for which the system attempts to enrich with program-level information. Typically, such traces can be obtained by existing mechanisms in modern operating systems and third-party supporting tools, such as sysdig. In a system-call trace, each entry typically includes information regarding the system call being invoked, the invoking process and thread, and arguments passed to and return value from the system call. The system of the present invention assumes that the input traces are separated by process and thread, therefore each trace will only include system-call information from a single thread of a single process without any interleaving.

Regarding system-call-to-user-function search 250, for each system-call trace, block 250 performs multiple and iterative searches that use some segments of the trace as queries over the information extracted and generated by 220.

During the searches, block 250 leverages the embedding models from block 220 to convert system-call queries into vector representations and performs similarity searches in the embedding space to identify similar system-call sequences in some corpuses generated in block 220. As such similar sequences are collected from some user functions, our system regards those functions as likely sources of system calls in the trace. Block 250 also incorporates some heuristics to narrow down the search scope to get more precise user functions. After the searches, block 250 identifies most likely user functions that trigger some segments of system calls in the trace.

System-call traces enriched by user function information 260 is the output from block 250, which enriches the input system-call traces with user function information. In particular, the original system-call traces are split into segments each of which may come from the same user function, and each of which is labeled with the likely user function(s). For instance, the aforementioned example of a system-call sequence "getsockname sendto recvmsg recvmsg recvmsg" may be identified by block 250 to be likely from the function getaddrinfo in the program binary libc.so.6 from a typical Linux system. In some cases, the label may include a plural number of likely user functions.

Provenance-graph construction 270 takes some system-call traces as input, and constructs a provenance graph by iteratively adding nodes and edges representing system entities (e.g., processes, files, sockets, and others) and entity relations reflected by certain system calls (e.g., a process reads a file). This process starts from certain user-specified entities, such as some files of interest, and iteratively identifies other entities that can be associated through system calls with the entities already included in the graph. Although this graph construction is not part of the present invention, it is enhanced by program-level information labeled to system calls by the original method in this invention, resulting in enriched graphs.

A description will now be given regarding provenance graphs enriched by user function information, in accordance with an embodiment of the present invention.

Figure 3:
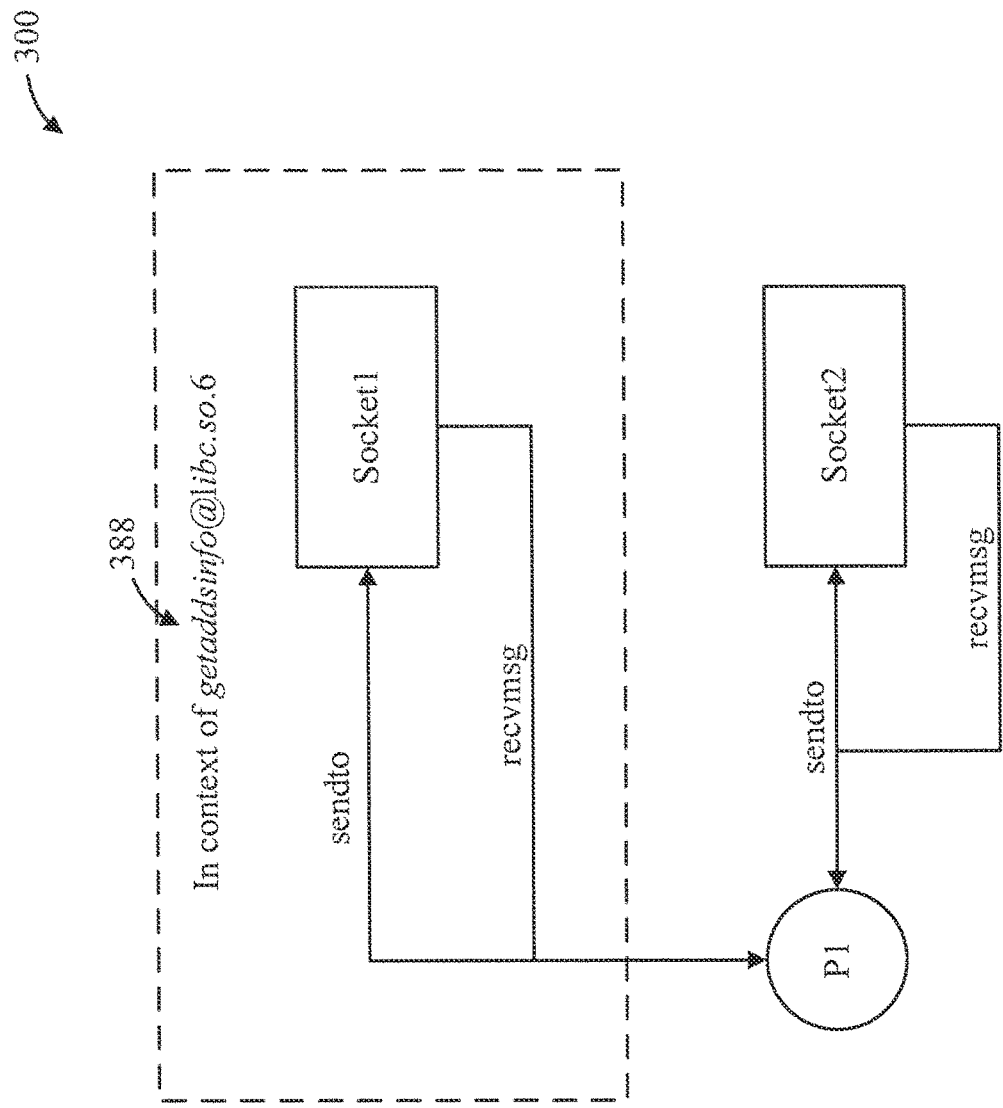
FIG. 3 is a block diagram showing an exemplary provenance graph with program-level information enrichment 388, in accordance with an embodiment of the present invention.

FIG. 3 is a block diagram showing an exemplary provenance graph 300 with program-level information enrichment 388, in accordance with an embodiment of the present invention.

As used herein, "program-level information" refers to high-level information such as names of user functions and libraries/binary objects that triggered the collected and shown system calls.

The graph represents a process reading from and writing to two sockets. If one were to understand whether there would be any difference between the two sockets and operations related to them, or one provenance-based application were to determine if the two sockets would be all normal or one of them abnormal, solely relying on the provenance graph without the user function information ("In context of getaddrinfo@libc.so.6") 388 would not be sufficient as there is no indicator to differentiate the two. On the other hand, the user function information 388 includes an additional label constructed from enriched system-call traces showing that one of the socket and its related operations are in context of the function getaddrinfo, which is known to "convert domain names, hostnames, and IP addresses between human-readable text representations and structured binary formats for the operating system's networking API". With this piece of high-level (program-level) information, one can determine the real program semantics of low-level socket operations, thereby effectively incorporating more context information into the understanding and decision-making process on the provenance graph. Furthermore, with this function information 388, the graph can even be compressed by merging the two edges between P1 and Socket1 to reduce the graph size. Consider the exemplar graph 300 in FIG. 3. Such a low-level provenance graph has edges labeled by system calls. If a process was very active, the graph would be very large and include many edges, each of which corresponds to a system call. As previously demonstrated, multiple system calls may be triggered by a single user function. Therefore, user functions can effectively group their triggered system calls (i.e., graph edges) to reduce the number of edges and nodes in a provenance graph (aka compression). Compressed edges in the resulting group would be labeled by user functions instead of system calls. Such compression is also useful in many scenarios where the graph size becomes a problem hindering applications based on provenance graphs.

Figure 4:
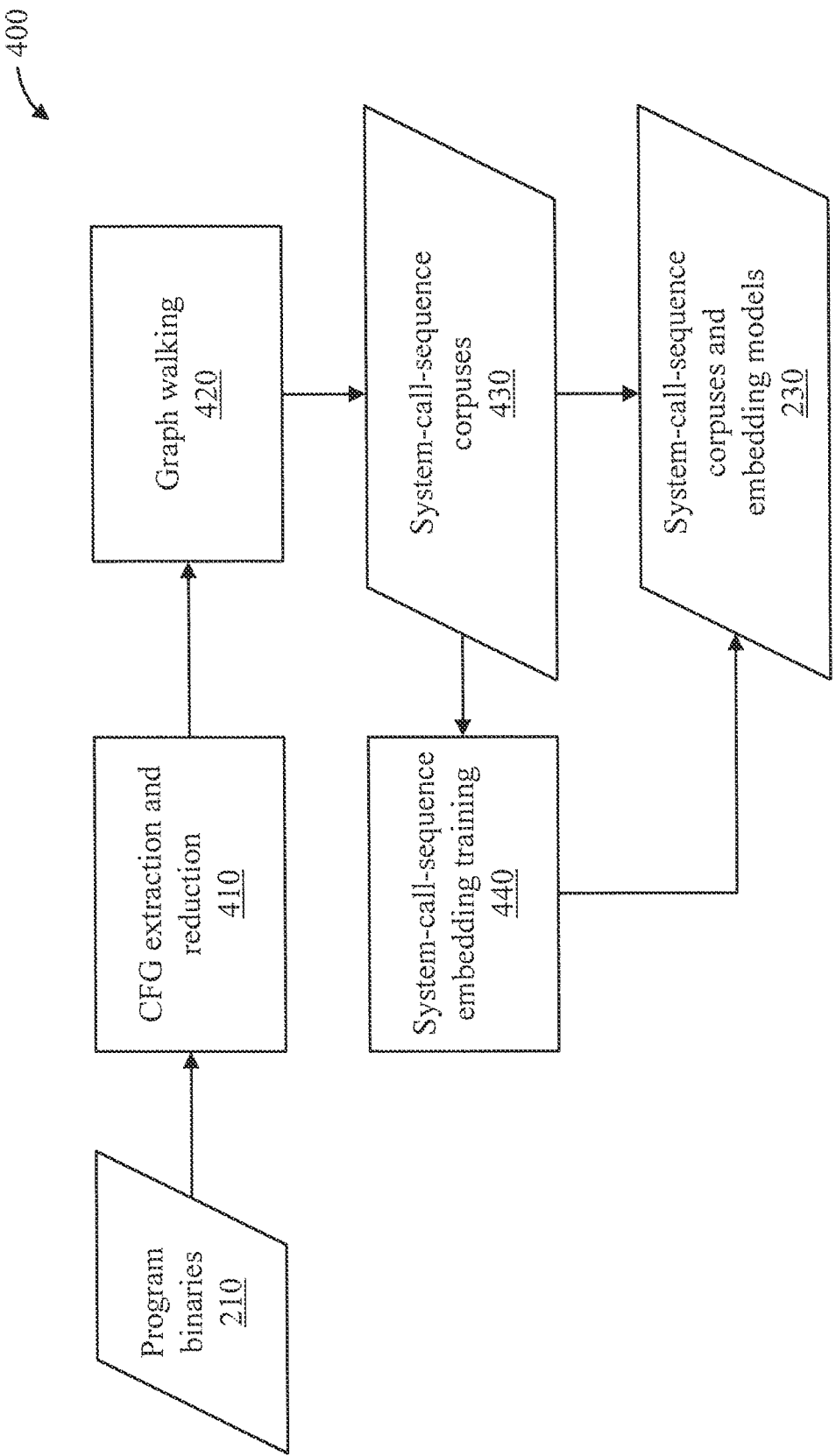
FIG. 4 is a flow diagram for a method for extracting information from program binaries for a later search step, in accordance with an embodiment of the present invention.

FIG. 4 is a flow diagram for a method 400 for extracting information from program binaries for a later search step, in accordance with an embodiment of the present invention. The method 400 requires program binaries as input and outputs system-call-sequence corpuses and embedding models for individual program binaries.

The method 400 involves the following blocks: program binaries 210; CFG extraction and reduction 410; graph walking 420; system-call-sequence corpuses 430; system-call-sequence embedding training 440; and system-call-sequence corpuses and embedding models 230.

Figure 5:
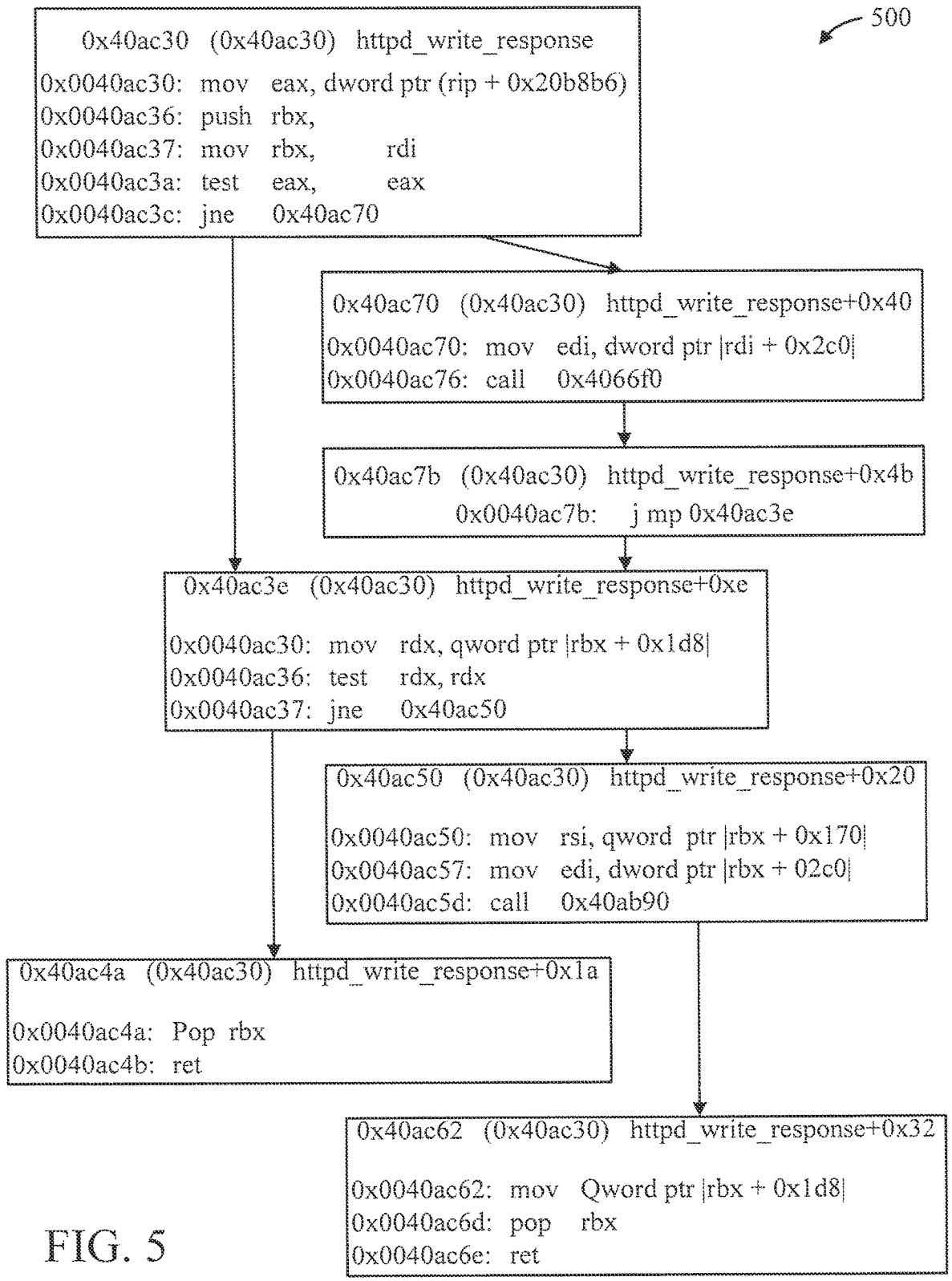
FIG. 5 is a Control-Flow Graph (CFG), in accordance with an embodiment of the present invention.

Regarding CFG extraction and reduction 410, block 410 starts from running a binary analysis tool to extract a control-flow graph (CFG) for each function in the input program binary. Usable tools include but are not limited to angr, radare2, and IDA disassembler. FIG. 5 is a Control-Flow Graph (CFG) 500, in accordance with an embodiment of the present invention. In a typical CFG from such tools as shown in FIG. 5, each node in the CFG represent a block of program instructions that end with an execution-flow change; and each edge between two nodes may have different meanings, but all indicate potential execution flows from one node to another. Possible edges may include function calls, function returns, conditional jumps, and unconditional jumps.

Figure 6:
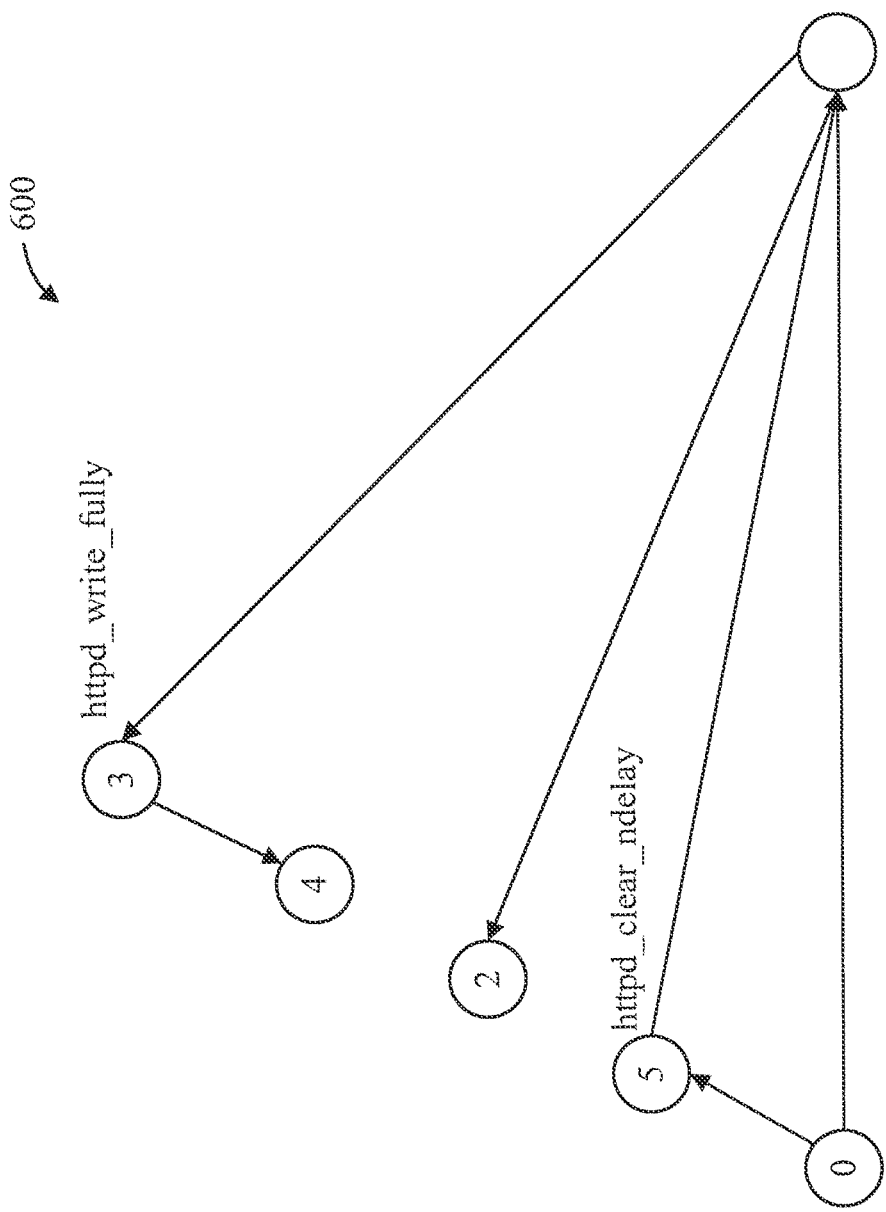
FIG. 6 is a block diagram showing an example of a function-call graph reduced from the CFG shown in FIG. 5.

For each extracted CFG, block 410 performs two additional post-processing operations. First, block 410 identifies nodes (instruction blocks) that end with a function call, and further identifies if such nodes are a function call to another user function, or to a system call. Binary analysis tools can usually provide call targets for this block to use, but in the cases that the tools fail to provide call targets because of the non-constant address in the call instruction, block 410 will apply heuristic rules to guess the possible address and search any function that starts from the guessed address. After identifying all the function-call nodes, block 410 performs a CFG reduction by removing non-function-call nodes as many as possible while keeping essential graph structures that preserve relations between function-call nodes. The resulting CFG becomes a function-call graph, in which a node either represents a function call or is empty. Such graphs may be much simpler with fewer nodes and edges compared to the corresponding full CFGs, and they are supposed to describe how function calls (both user functions and system calls) would be made during program executions. FIG. 6 shows an example of a function-call graph 600 reduced from the CFG 500 shown in FIG. 5. It shows that two function calls (labeled by names of call targets) in the original CFG 500 are preserved as well as their program-logic relations.

The graph walking step 420 traverses the graphs produced by 410, and extracts system-call sequences corresponding to paths including only system-call nodes in those graphs. Block 420 employs different walking strategies, including random walk up to a specified length, and n-gram enumeration to traverse graphs that can be related by function calls. As system calls are usually triggered in some common program libraries, such as the C standard library libc, and there may be multiple levels of function calls from a user function to libc functions that trigger system calls, block 420 performs a two-layer walking based on the boundary of higher-level user functions that do not directly trigger system calls and lower-level user functions that trigger system calls. In particular, on graphs of higher-level user functions, block 420 performs n-gram enumeration of all function calls to lower-level user functions that may further trigger system calls (such lower-level user functions are typically libc functions). Then within the graphs of each enumerated lower-level user function and related functions called by it, block 420 further performs random walks starting from each system-call node up to a user-specified length for up to a user-specified times to collect system-call sequences. The combination of n-gram enumeration and random walks addresses the path explosion problem where all target graphs combined become too large and complex to be fully traversed.

System-call-sequence corpuses 430 will now be described. The result of graph walking 420 includes two parts: a system-call-sequence corpus for each lower-level user function (extracted by random walks in 420), and metadata of call patterns of lower-level user functions with context of higher-level user functions (extracted by n-gram enumeration in 420). Each system-call-sequence corpus contains one or more system-call sequence consisting of a variable number of names of system calls up to the length specified for random walks in 420. Each corpus represents possible system-call patterns sampled from the related lower-level user function. The metadata of call patterns represent lower-level user-function call patterns in the form of n-grams. For example, if in the user program, a call to the lower-level libc function getaddrinfo precedes a call to tzset, the call pattern getaddrinfo and tzset with their calling higher-level user function(s) are then included in the metadata.

Regarding system-call-sequence embedding training 440, for each analyzed program binary, block 440 trains an embedding model using system-call-sequence corpuses sampled from different user functions. The resulting embedding model can convert a sequence of system calls (more specifically, names of system calls) into a fixed-length vector (embedding), with the property that similar sequences would be in close proximity to each other. This embedding property allows downstream steps to perform inexact searches for similar system-call sequences. The embedding technique in block 440 is commonly known as document embedding in natural language processing. Any of such document embedding techniques that can satisfy the aforementioned property will be usable, e.g., sent2vec and doc2vec.

Figure 7:
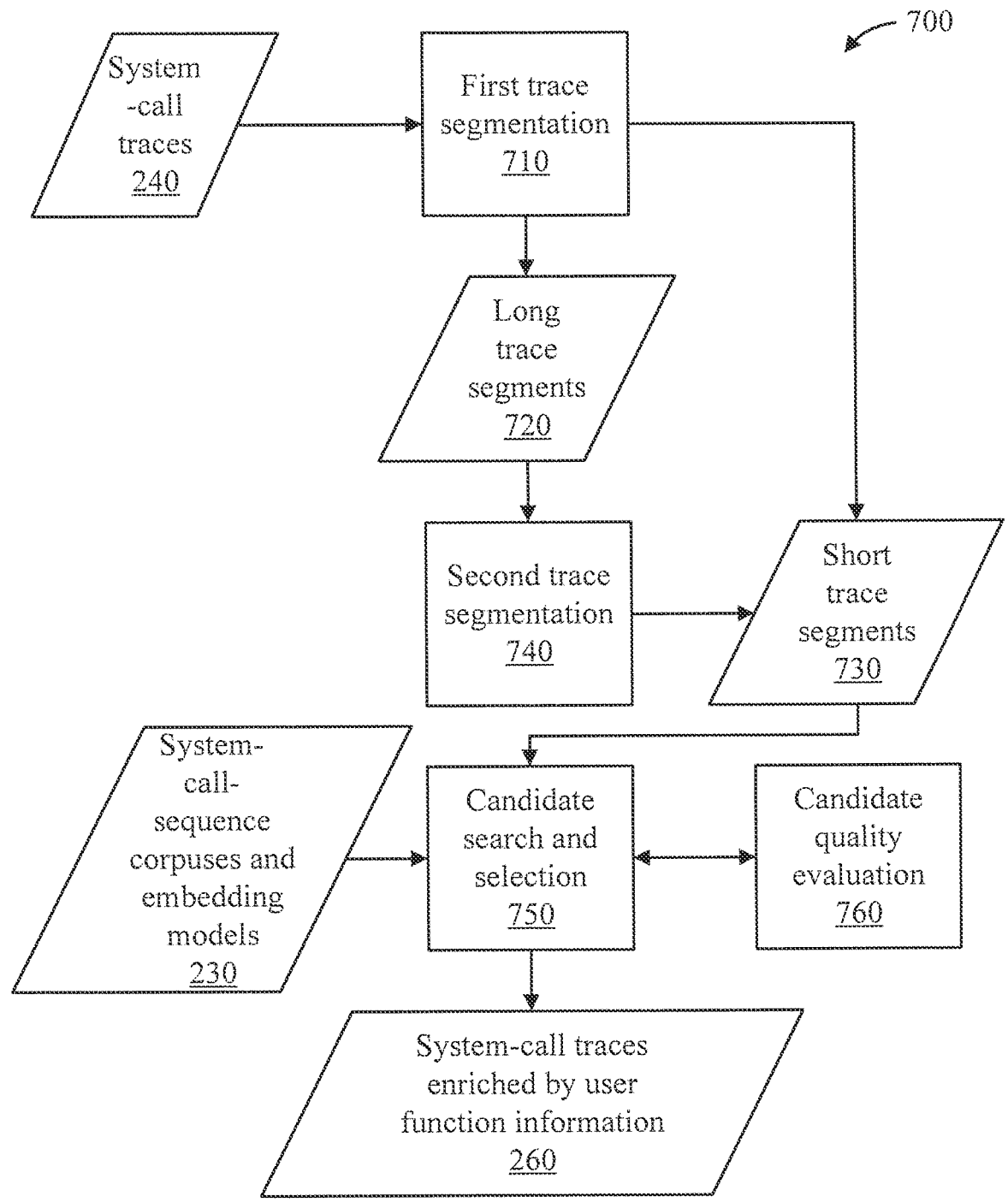
FIG. 7 is a flow diagram for a system-call-to-user function search, in accordance with an embodiment of the present invention.

FIG. 7 is a flow diagram for a system-call-to-user function search 700, in accordance with an embodiment of the present invention. In particular, FIG. 7 shows the flow diagram to model an input system-call trace as multiple queries and perform query searches over system-call-sequence corpuses using the pretrained embedding models to identify user function for input system calls. The system of the present invention assumes that the input traces are separated by process and thread, therefore each trace will only include system-call information from a single thread of a single process without any interleaving. All descriptions of the following steps are based on a single trace (i.e., a single sequence of system calls) from a single program that is known by the process name in the trace.

System-call-to-user function search 700 involves the following blocks: system-call traces 240; first trace segmentation 710; long trace segments 720; short trace segment 730; second trace segmentation 740; system-call-sequence corpuses and embedding models 230; candidate search and selection 750; candidate quality evaluation 760; and system-call traces enriched by user function information 260.

Regarding, first trace segmentation 710, as the input system-call trace from 240 can be arbitrarily long, block 710 attempts to segment a long trace into shorter segments that are easier to handle for later steps. To perform the segmentation, block 710 searches for certain landmark system calls in the input trace and segments the trace at those landmark points. Landmark system calls in this context refers to system calls that are uniquely and exclusively triggered by some lower-level user functions. Such lower-level user functions are identified by block 120 in the user program. The outcome of block 710 includes multiple trace segments of variable lengths. Depending on the graph walking length defined in block 420, those segments may be classified into two types: long trace segments (block 720) and short trace segments (block 730).

A long trace segment 720 is a segment of a system-call trace that exceeds the graph walking length.

A short trace segment 730 is a segment of a system-call trace that is within the graph walking length.

Second trace segmentation 740 performs a further segmentation on long trace segments (block 720) generated by block 710, as searches conducted by block 750 may not be effective if the trace length is longer than the graph walking length. This second segmentation attempts to further divide a long trace segment at any point where there is a likely transition from a lower-level user function to another, i.e., the system calls before and after the point likely come from two different lower-level user functions. To do so, block 740 performs two sub-steps: (1) similarity searches using an increasing window over a long trace segment to identify candidates of likely lower-level user functions for subsequences of different lengths, and (2) measurements of Jaccard similarity index $$J(A, B) = \frac{|A \cap B|}{|A \cup B|} = \frac{|A \cap B|}{|A| + |B| - |A \cap B|}.$$

between the identified candidates from searches of different window sizes to identify suitable cutting points. The key insight is that if at one point the measured Jaccard similarity index drops significantly, that point will likely be a transition point where all its preceding system calls may come from a different lower-level user function.

As a toy example for block 740, given a system-call segment "getsockname sendto recvmsg recvmsg recvmsg," block 740 first performs a similarity search starting from a predefined minimal length of system-call subsequence as a search query, e.g., "getsockname sendto recvmsg." In doing the similarity search, block 740 uses the embedding model from block 230 to convert the subsequence into a vector representation, and then searches for the top-k closest system-call sequences (in the corpuses from block 230) in the embedding space. With the search result, block 740 creates a candidate set $C_1$ of lower-level user functions from which those identified closest sequences come from. After the first iteration, block 740 increases the window to include more system call(s), e.g., increasing the window by 1 to form a new search query "getsockname sendto recvmsg recvmsg," and repeats the search to get another candidate set $C_2$. Block 740 keeps repeating such similarity searches to get more candidate sets $C_3, C_4, \ldots, C_n$ until the search query reaches a predefined length or the length of the whole segment, whichever is smaller. With all the candidate sets, block 740 computes Jaccard similarity index between candidate sets from adjacent iterations, i.e., between $C_1$ and $C_2$, $C_2$ and $C_3$, and so on. For n iterations, block 740 computes n−1 Jaccard similarity indexes, and the smallest value below a user-specified threshold indicates that the most likely cutting point is in the incremental part of the two corresponding search queries. So block 740 further segments the long trace segment at those system calls, and then it repeats the whole process starting from the last cutting point to segment all the remaining long trace segment(s) into short trace segments.

Figure 8:
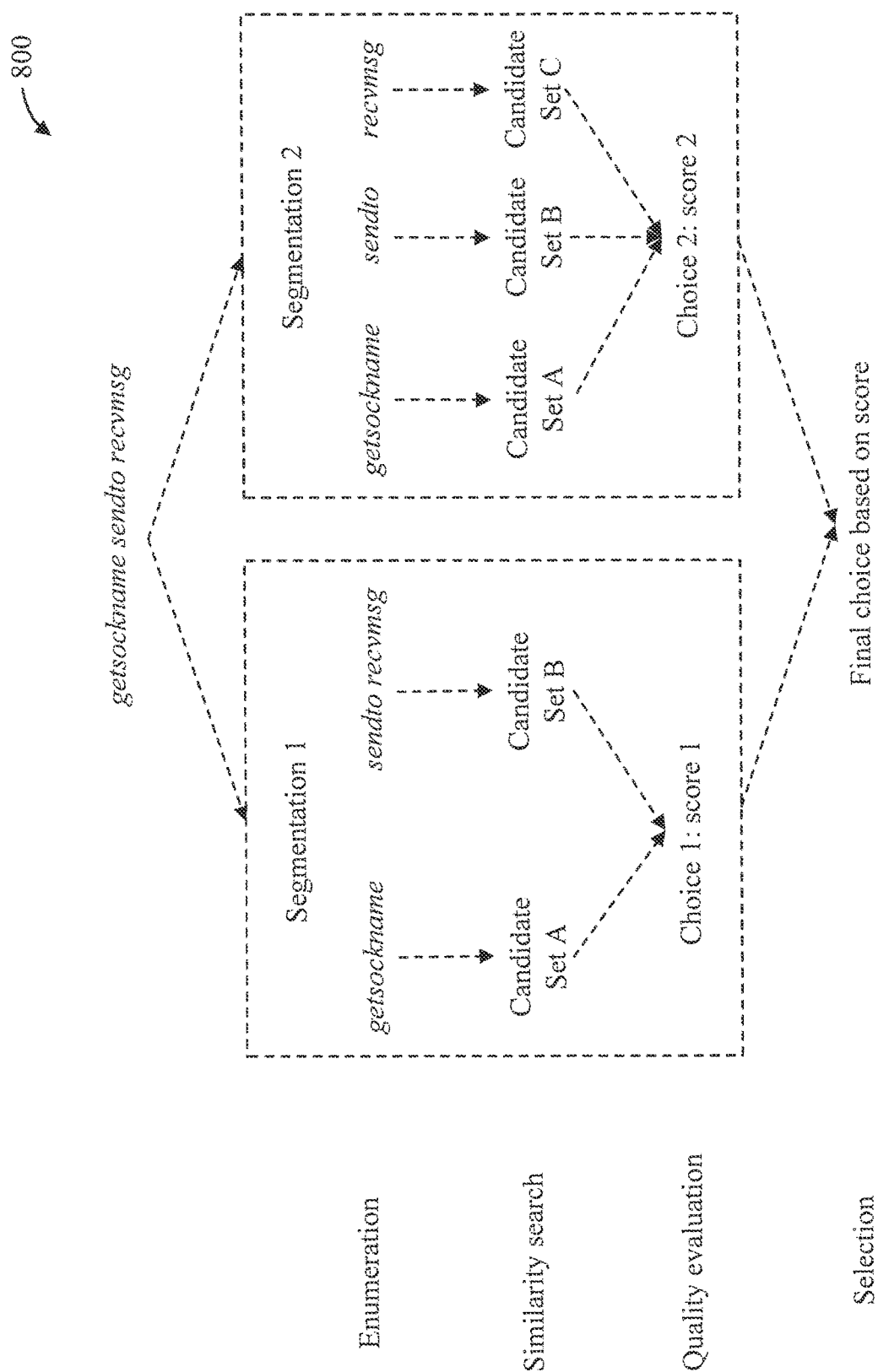
FIG. 8 is a block diagram showing an example of candidate search and selection block 750 of FIG. 7, in accordance with an embodiment of the present invention.

For each short trace segment 730, candidate search and selection block 750 identifies the most likely lower-level user functions that trigger each of the system calls in the segment. With metadata from block 230, block 750 also lists higher-level user functions that call those identified lower-level user functions. Block 750 assumes that system calls in the segment may come from different lower-level user functions. Therefore, it first enumerates all possible segmentations of system calls in the segment. For n system calls, there are $2^{n-1}$ different segmentations. For example, in a segment of "getsockname sendto recvmsg," with the assumption they may come from different functions, this step enumerates 4 different cases: (1) "getsockname", "sendto", "recvmsg," (2) "getsockname sendto" and "recvmsg," (3) "getsockname" and "sendto recvmsg," and (4) "getsockname sendto recvmsg." For each of such cases, block 750 then performs a similarity search (also described in block 540) on every system-call subsequence to get a candidate set of likely functions. As a result, there is a list of candidate sets corresponding to system-call subsequences in each case, and in total $2^{n-1}$ of such lists representing different choices of user functions for a segment with n system calls. Among all those lists (choices), block 750 then invokes block 760 to evaluate the likelihood of each individual choice and selects the most likely choice with the most likely user-function candidates as its output. FIG. 8 is a block diagram showing an example of candidate search and selection block 750 of FIG. 7, in accordance with an embodiment of the present invention.

The candidate-quality evaluation block 760 evaluates the likelihood of a choice (i.e., a specific segmentation on n system calls with candidate functions for each subsequence from the segmentation) from block 750 by assigning a relative score to the choice. With all choices assigned corresponding scores, block 750 is able to select the choice with the most significant score. This step determines the score by multiple measurable factors related to the choice from block 750. First, it leverages the call patterns of lower-level user functions with context of higher-level user functions. This piece of information essentially provides a filtering power that can tell which candidate functions identified for adjacent subsequences are more likely because of they may have call patterns in the user program. Therefore, those candidate functions appear in such patterns are up-weighted, while the others are down-weighted. Second, this step also leverages embedding space distances of the top-k closest system-call sequences identified in similarity searches, as distances are expected to follow certain distribution that distinguishes between good and bad choices. In particular, for a good choice, the average and dispersion of such distances from searches of all subsequences should remain lower than that of a bad choice.

Figure 9:
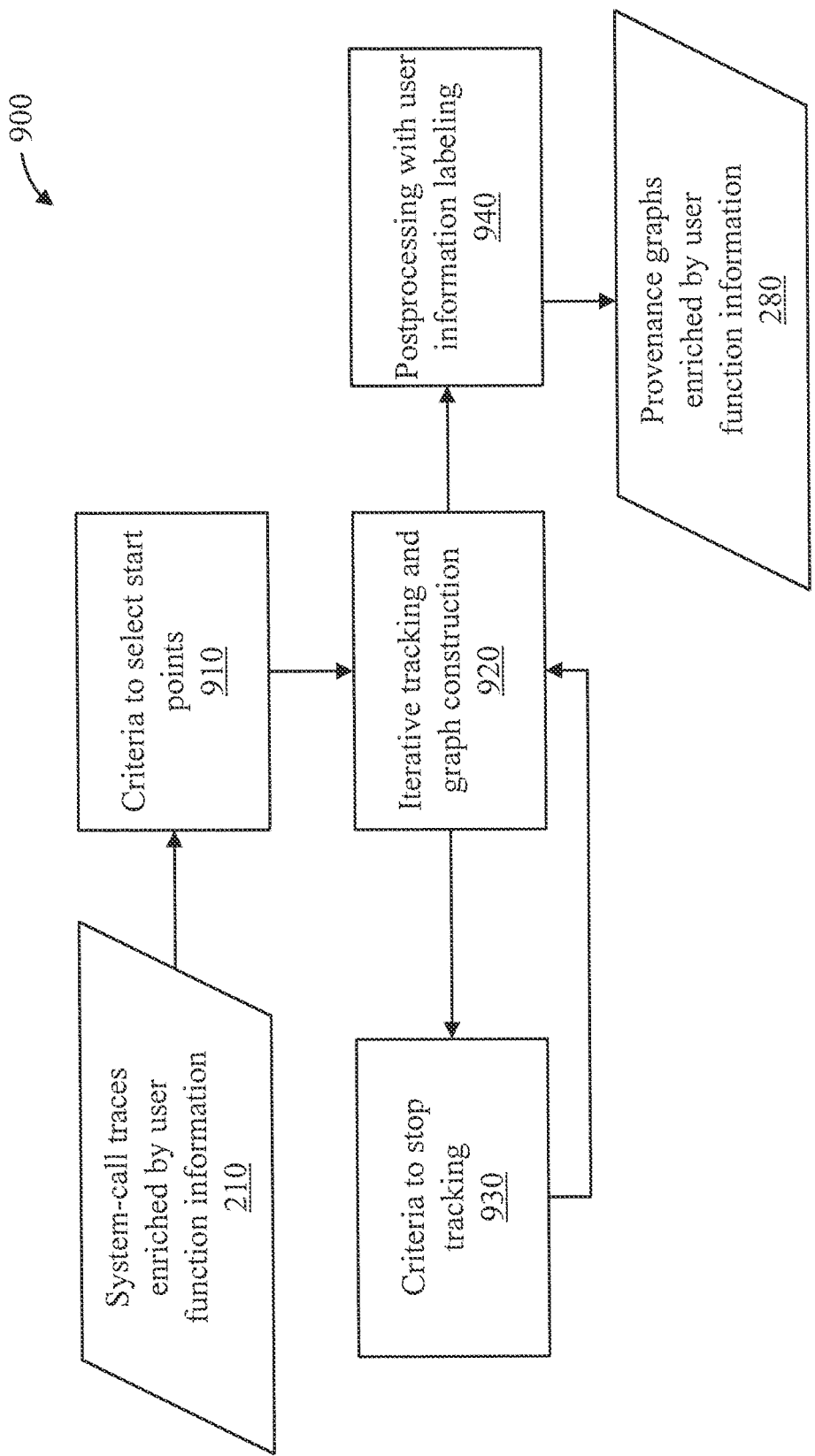
FIG. 9 is a flow diagram showing an exemplary provenance-graph construction process with system-call traces enriched by block 250 of FIG. 2, in accordance with an embodiment of the present invention.

FIG. 9 is a flow diagram showing an exemplary provenance-graph construction process 900 with system-call traces enriched by block 250 of FIG. 2, in accordance with an embodiment of the present invention. With enriched system-call traces the resulting graphs present useful program-level information for other downstream tasks. This graph construction process essentially performs search and tracking in system-call traces for specific system entities (processes, files, and sockets) and their related operations in terms of specific system calls (read, write, and so on).

The provenance-graph construction process 900 involves the following blocks: system-call traces enriched by user function information 260; criteria to select start points 910; iterative tracking and graph construction 920; criteria to stop tracking 930; postprocessing with user information labeling 940; and provenance graphs enriched by user function information 280.

Regarding criteria to select start points 910, start points of graph construction are usually user-specified system entities of interest with a specified starting timestamp. Such system entities may be processes of certain programs, and files matching certain name patterns.

Regarding iterative tracking and graph construction 920, starting from the initial points, the tracking process iteratively performs forward and backward tracking through system-entity interactions and time. For instance, if the starting point is a file, then forward tracking identifies in the traces all processes that read the file after the specified timestamp; and backward tracking identifies all processes that write to the file before the specified timestamp. The identified entities and operations become nodes and edges of a provenance graph, respectively.

Regarding criteria to stop tracking 930, as a system can keep running and generate an arbitrary number of related system entities and operations, it is necessary to stop tracking at some point to prevent a graph from growing indefinitely. Such criteria can be based on, but not limited to, a time range, i.e., only tracking a certain time range from the starting timestamp; or the number of hops from the start point.

Regarding postprocessing with user-function information labeling 940, as the graph construction process searches system-call traces and identifies entities and operations of interest, having user-level program information attached to traces naturally provides another layer of information that can be incorporated into node/edge labels in provenance graphs. Therefore, this step adds more program-level labels to graphs constructed in previous steps. Furthermore, this step also compresses nodes and edges based on program-level labels to create more concise graphs. For example, if a series of consecutive operations (edges) and subject entities (nodes) are all labeled with the same program-level label, these corresponding edges may be merged together as they as a whole represent an entire unit of program logic.

A description will now be given regarding intrusion detection and investigation, in accordance with an embodiment of the present invention.

In an embodiment, an intrusion detection system applying the invention would receive system-call sequences as input and detect irregular system calls for potential intrusion signals. For the sake of illustration, the invention may be applied in two different ways to improve intrusion detection and/or intrusion investigation.

In the setting of improving intrusion detection, embodiments of the present invention can be installed as a preprocessing module for system-call sequences. This preprocessing would convert low-level and verbose system-call sequences into provenance graphs with edge labels describing high-level system operations. The provenance graphs can then be fed into a graph-based intrusion detection algorithm. A major improvement introduced by embodiments of the present invention over conventional provenance graphs is that the resulting graphs would be much compact and less verbose, providing more scalability and encoding a much larger execution context in which some complex attacks may span for effective detection.

In the setting of improving intrusion investigation, embodiments of the present invention can be installed as a postprocessing module to explain detected system-call anomalies in a higher system level. Embodiments of the present invention would take in system-call sequences in which anomalies are detected, and map low-level system calls to high-level provenance graphs with program contexts to help security analysts understand what have happened. The resulting high-level graphs make investigation and understanding more easier than low-level system-call sequences.

Figure 10:
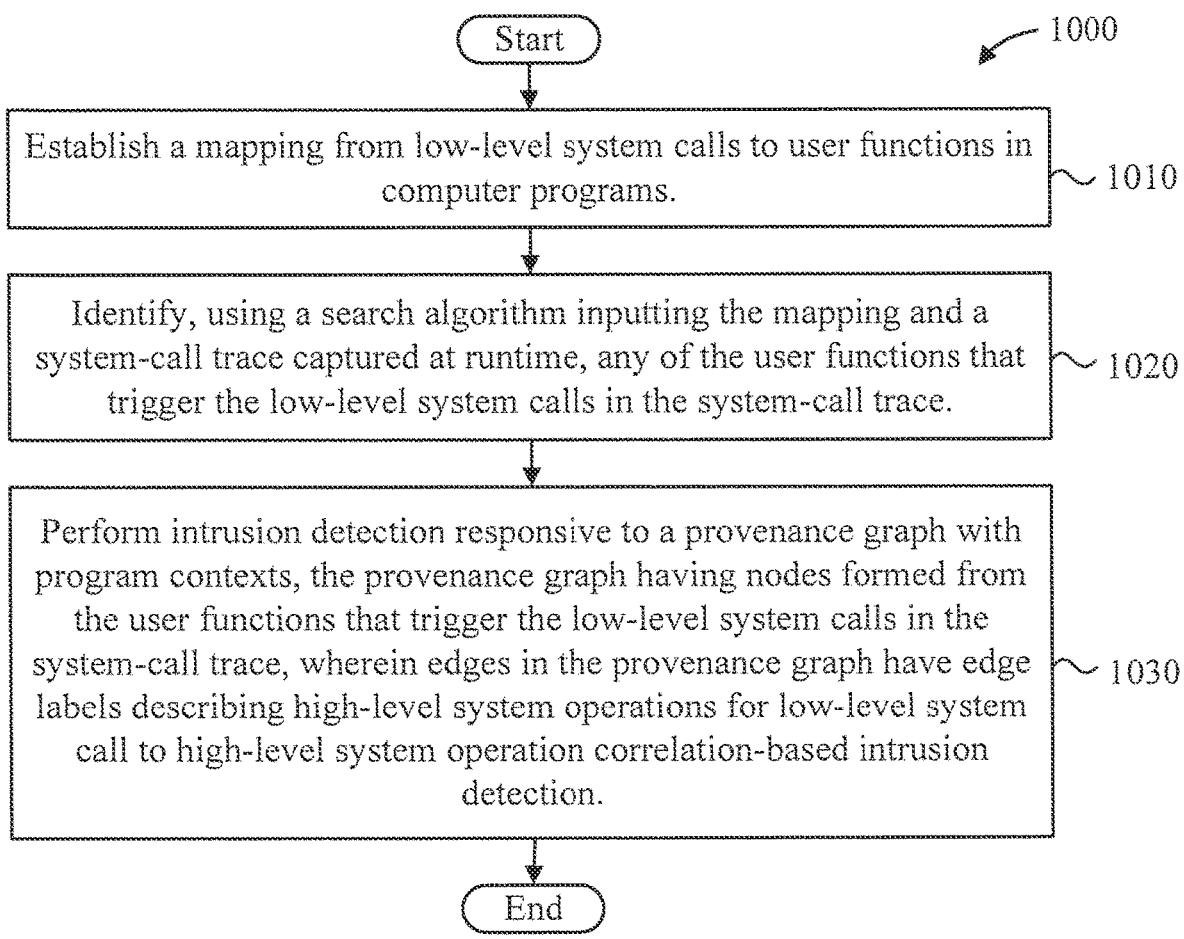
FIG. 10 is a flow diagram showing an exemplary high-level method, in accordance with an embodiment of the present invention.

FIG. 10 is a flow diagram showing an exemplary method 1000 for intrusion detection, in accordance with an embodiment of the present invention.

At block 1010, establish a mapping from low-level system calls to user functions in computer programs.

At block 1020, identify, using a search algorithm inputting the mapping and a system-call trace captured at runtime, any of the user functions that trigger the low-level system calls in the system-call trace.

At block 1030, perform intrusion detection responsive to a provenance graph with program contexts, the provenance graph having nodes formed from the user functions that trigger the low-level system calls in the system-call trace, wherein edges in the provenance graph have edge labels describing high-level system operations for low-level system call to high-level system operation correlation-based intrusion detection.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for computer intrusion detection, comprising:
   establishing a mapping from low-level system calls to user functions in computer programs, the user functions running in a user space of an operating system;
   identifying, using a search algorithm inputting the mapping and a system-call trace captured at runtime, any of the user functions that trigger the low-level system calls in the system-call trace; and
   performing, by a processor device, intrusion detection responsive to a provenance graph with program contexts, the provenance graph having nodes formed from the user functions that trigger the low-level system calls in the system-call trace, wherein edges in the provenance graph have edge labels describing high-level system operations for low-level system call to high-level system operation correlation-based intrusion detection.

2. The computer-implemented method of claim 1, wherein establishing the mapping comprises performing binary analysis and machine learning on the computer programs to (1) extract control flow graphs (CFGs) from the user functions and identify CFG nodes that trigger system calls or make function calls to other user functions; (2) perform graph walks through the CFGs to collect system-call sequences that the function calls may trigger; (3) train, using the system-call sequences, a system-call-sequence embedding model that can convert a system-call sequence, from among the system-call sequences, into a vector-space representation.

3. The computer-implemented method of claim 2, wherein train, using the system-call sequences, a system-call-sequence embedding model comprises:
   generating a system-call-sequence corpus for each of the user functions that represents the possible system-call-sequence patterns for each of the user functions; and
   training the system-call-sequence embedding model using the corpus generated for each of the user functions.

4. The computer-implemented method of claim 2, wherein the embedding model converts varying-length system-call sequences to a fixed length vector as the vector-space representation.

5. The computer-implemented method of claim 1, wherein the search algorithm comprises (1) a heuristic method to segment the system-call trace in order to reduce a search space for user function identification; (2) a search method leveraging the system-call-sequence embedding model, the system-call sequences collected from the CFGs, and a set of heuristics to enumerate candidates of possible ones of the user functions within a segment of the system-call trace; and (3) a quality measurement function to compare different ones of the candidates and select a set of most likely candidates as a search output.

6. The computer-implemented method of claim 1, wherein the any of the user functions that trigger the low-level system calls in the system-call trace are identified in an embedding space.

7. The computer-implemented method of claim 1, further comprising enriching the system-call trace with user function information.

8. The computer-implemented method of claim 1, further comprising merging two of the edges of the provenance graph based on user function information.

9. The computer-implemented method of claim 1, further comprising performing a CFG reduction on at least one of the CFGs by removing non-function-call nodes therefrom to form a function-call graph.

10. The computer-implemented method of claim 1, further comprising performing two-layer graph walking to extract system-call sequences, a first layer of the two-layer graph walking based on a boundary of higher-level user functions that do not directly trigger system call and lower-level user functions that trigger system calls.

11. A computer program product for computer intrusion detection, the computer program product comprising a non-transitory computer readable storage medium having program instructions embodied therewith, the program instructions executable by a computer to cause the computer to perform a method comprising:
   establishing, by a processor device of the computer, a mapping from low-level system calls to user functions in computer programs, the user functions running in a user space of an operating system;
   identifying, by the processor device using a search algorithm inputting the mapping and a system-call trace captured at runtime, any of the user functions that trigger the low-level system calls in the system-call trace; and
   performing, by the processor device, intrusion detection responsive to a provenance graph with program contexts, the provenance graph having nodes formed from the user functions that trigger the low-level system calls in the system-call trace, wherein edges in the provenance graph have edge labels describing high-level system operations for low-level system call to high-level system operation correlation-based intrusion detection.

12. The computer program product of claim 11, wherein establishing the mapping comprises performing binary analysis and machine learning on the computer programs to (1) extract control flow graphs (CFGs) from the user functions and identify CFG nodes that trigger system calls or make function calls to other user functions; (2) perform graph walks through the CFGs to collect system-call sequences that the function calls may trigger; (3) train, using the system-call sequences, a system-call-sequence embedding model that can convert a system-call sequence, from among the system-call sequences, into a vector-space representation.

13. The computer program product of claim 12, wherein train, using the system-call sequences, a system-call-sequence embedding model comprises:
   generating a system-call-sequence corpus for each of the user functions that represents the possible system-call-sequence patterns for each of the user functions; and
   training the system-call-sequence embedding model using the corpus generated for each of the user functions.

14. The computer program product of claim 12, wherein the embedding model converts varying-length system-call sequences to a fixed length vector as the vector-space representation.

15. The computer program product of claim 11, wherein the search algorithm comprises (1) a heuristic method to segment the system-call trace in order to reduce a search space for user function identification; (2) a search method leveraging the system-call-sequence embedding model, the system-call sequences collected from the CFGs, and a set of heuristics to enumerate candidates of possible ones of the user functions within a segment of the system-call trace; and (3) a quality measurement function to compare different ones of the candidates and select a set of most likely candidates as a search output.

16. The computer program product of claim 11, wherein the any of the user functions that trigger the low-level system calls in the system-call trace are identified in an embedding space.

17. The computer program product of claim 11, wherein the method further comprises enriching the system-call trace with user function information.

18. The computer program product of claim 11, wherein the method further comprises merging two of the edges of the provenance graph based on user function information.

19. The computer program product of claim 11, wherein the method further comprises performing a CFG reduction on at least one of the CFGs by removing non-function-call nodes therefrom to form a function-call graph.

20. A computer processing system for computer intrusion detection, comprising:
   a memory device for storing program code; and
   a hardware processor operatively coupled to the memory device for running the program code to
      establish a mapping from low-level system calls to user functions in computer programs, the user functions running in a user space of an operating system;
      identify, using a search algorithm inputting the mapping and a system-call trace captured at runtime, any of the user functions that trigger the low-level system calls in the system-call trace; and
      perform intrusion detection responsive to a provenance graph with program contexts, the provenance graph having nodes formed from the user functions that trigger the low-level system calls in the system-call trace, wherein edges in the provenance graph have edge labels describing high-level system operations for low-level system call to high-level system operation correlation-based intrusion detection.

* * * * *